Feb. 4, 1958  R. G. LIRES  2,822,186
VEHICLE SUSPENSION SYSTEM
Filed April 13, 1954  2 Sheets-Sheet 1

INVENTOR.
RAYMOND G. LIRES
BY
ATTORNEY

Feb. 4, 1958 R. G. LIRES 2,822,186
VEHICLE SUSPENSION SYSTEM
Filed April 13, 1954 2 Sheets-Sheet 2

INVENTOR.
RAYMOND G. LIRES
BY Robert C. Comstock
ATTORNEY

United States Patent Office 2,822,186
Patented Feb. 4, 1958

2,822,186

VEHICLE SUSPENSION SYSTEM

Raymond G. Lires, Manhattan Beach, Calif.

Application April 13, 1954, Serial No. 422,715

4 Claims. (Cl. 280—106.5)

This invention relates to a motor vehicle suspension system.

It is an object of the invention to provide a suspension system which is designed to take advantage of centrifugal force and pendulum action to neutralize sway and roll on curves.

A further object of the invention is to provide a wheel suspension which uses a coil spring which is longer and softer than those presently used and which resists rising movement of the wheel and which is so positioned centrally with respect to the width of the vehicle that upward movement of one wheel will be resisted with almost half of the static weight of the vehicle.

A further object is to provide a suspension system which prevents the front of the vehicle from nosing down when braking and which will reduce starting skid.

Another object of the invention is to provide a torsion bar which causes the rising motion of one road wheel to be opposed by the opposite wheel.

It is also among the objects of my invention to provide a suspension system with more efficiency, while improving its unit production, unit assembly, reduction of parts; grease fittings and reduce man hours devoted to the production of each automobile.

A further object is to replace the complexity of the conventional front frame structure and leave more room for free distribution and positioning of weight and engine components without lengthening the wheelbase and at the same time simplify the front frame area for possible use of front wheel drive.

Another object of the invention is to provide a suspension system having all the above characteristics and so designed that it can be added with little change to the present automobile.

A suspension system embodying my invention comprises a cradle frame suspending the weight of the vehicle from a point above its center of gravity, having compression coil springs bearing that load down to the wheels and having arms from the frame holding the wheels in a vertical relation to the frame, allowing each wheel to operate independently and allowing centrifugal force to pendulum the weight of the body and frame against the arms, neutralizing the opposing force of the wheels on ground and thereby stabilizing roll on a curve and providing more traction.

With my system, the wheel loads are transmitted directly to a more central portion of the automobile, resulting in less leverage action, with fulcrum points closer to the center of the static load and thus eliminating much stress and twist in the chassis and transmitting less effect of the irregularities of the road to the supported body.

Another feature of my invention is that wheels individually suspended from very soft springs are the only means of assuring efficient ground adherence and freedom from vibration. It has been found impractical to incorporate such individually suspended wheels in existing automobile structures because such structures do not furnish the room necessary to accommodate and control such suspension. The longer length offered by a high suspension point and the diagonal placement of the springs permits longer and softer springs to be used.

The wheels are mounted at the end of horizontal arms, with a torsion bar attached between the opposite arms and fulcrumed at the frame, so that the movement of one wheel due to a road obstacle will be resisted by the opposite wheel unit through the torsion bar; such movement is resisted progressively by the weight of the opposite arm, wheel, spring and shock absorber mounting and at the same time progressively moving the frame downwardly, allowing more static weight to oppose the shock being transmitted to the body.

Another feature of my system is that a frame suspended at one point in the center of its width in the front portion of a vehicle and another such point in the rear portion of the vehicle eliminates twist. The present cross braces used to resist chassis twist would be eliminated, the frame extremities lightened, being relieved of suspension functions, with the metal saved being used for strengthening the center portion from which the extremities are cantilevered, equalizing the amount of material used in both systems.

Another advantage of my construction is the protection provided for passengers in case of collision. The frame extensions protect passengers from sideward or downward collapse. A front or rear collision would be absorbed by the wheel arms against the center of the frame and upon the bearings connecting the arms to the frame, in a serious collision allowing the arms and wheels to pass below the passengers.

When braking, the wheels, being fastened to arms extending inwardly to the frame, act as levers to exert force downwardly in the rear portion of the vehicle and upwardly in the front portion of the vehicle, thus neutralizing opposing forces that cause the front to go down when braking in conventional systems. The same feature lifts the rear portion of the vehicle when torque energy is applied, thereby constantly retaining a load on the rear wheels and reducing starting skid.

The front spring assemblies and frame extension fit above and beehind the engine and in front of or incorporated into the fire wall in such a manner as to operate out of the way of any major component and still allow for repair or replacement. The rear spring assemblies will fit behind the rear seat and in front of the luggage compartment and be shielded from road dust by enclosure in a hollow shell to not detract from luggage space and without changing the design, retaining the present frame and permitting the use of any body forming material.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings.

Figure 1:
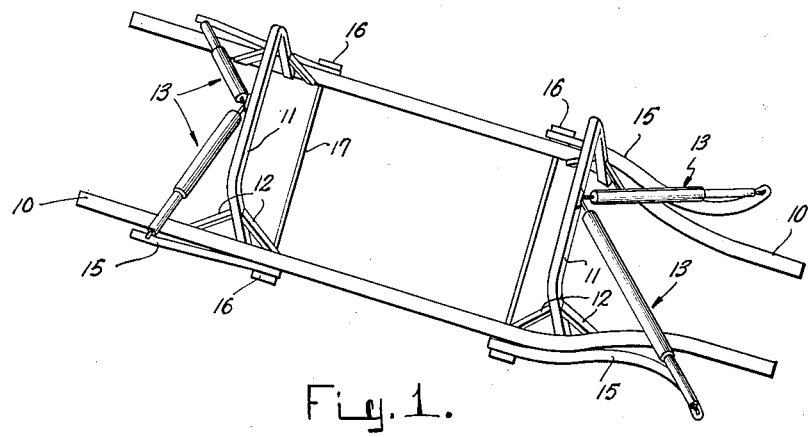
Fig. 1 is a diagrammatic view of my suspension system.
Figure 2:
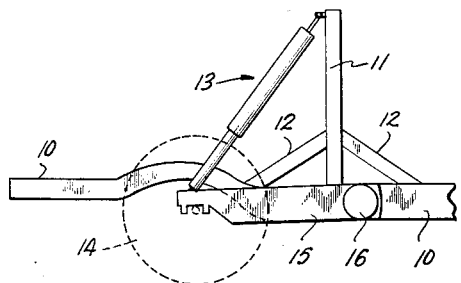
Fig. 2 is a side elevational view of the rear portion of my suspension system, with only one spring assembly installed.
Figure 3:
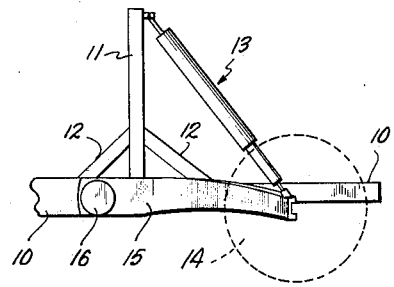
Fig. 3 is a side elevational view of the front portion of my suspension system, with only one spring assembly installed.
Figure 4:
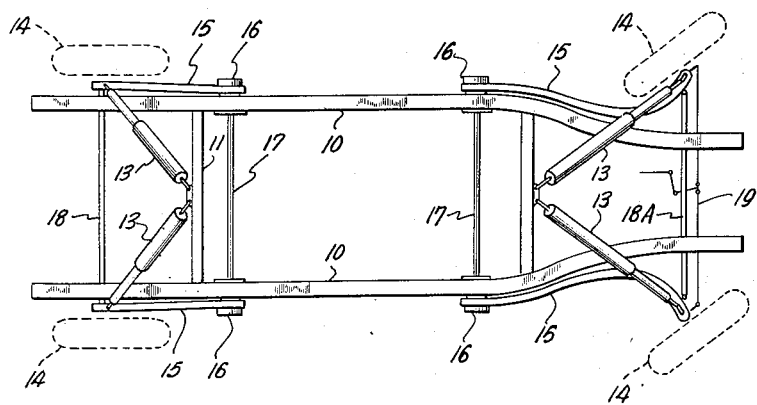
Fig. 4 is a top view of my suspension system.
Figure 5A:
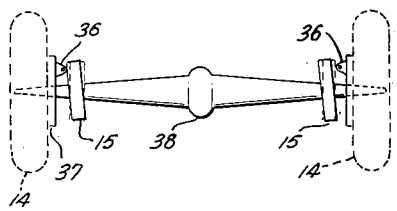
Fig. 5A is a front view partially in section showing the drive axle housing and part of the suspension system.
Figure 5B:
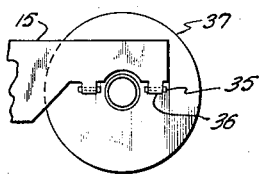
Fig. 5B is a side elevational view of the wheel backing plate, king pins and part of the wheel arm.
Figure 5C:
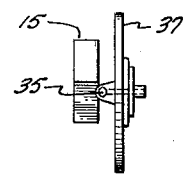
Fig. 5C is an end view of the wheel backing plate, king pin and wheel arm.
Figure 6:
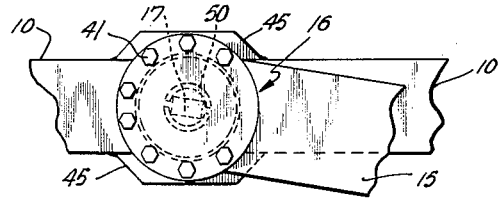
Fig. 6 is a side view of the disk type bearing, part of the frame and part of the suspension arm.
Figure 8:
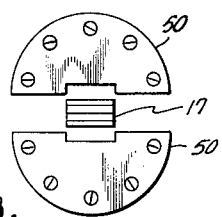
Fig. 8 is an enlarged end view of the split collar.
Figure 7:
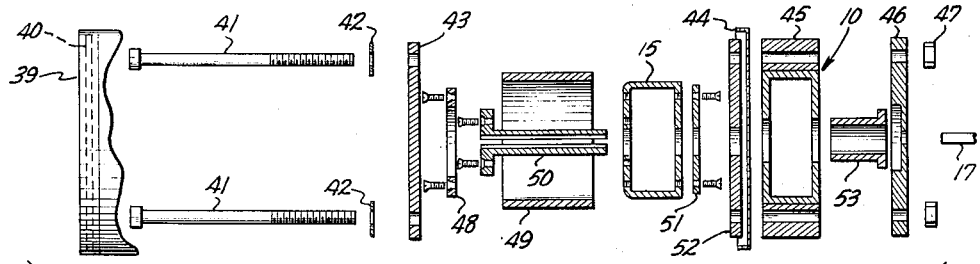
Fig. 7 is an enlarged sectional end view of the component parts of the disk bearing, part of the frame and part of the suspension arm.
Figures 9, 10:
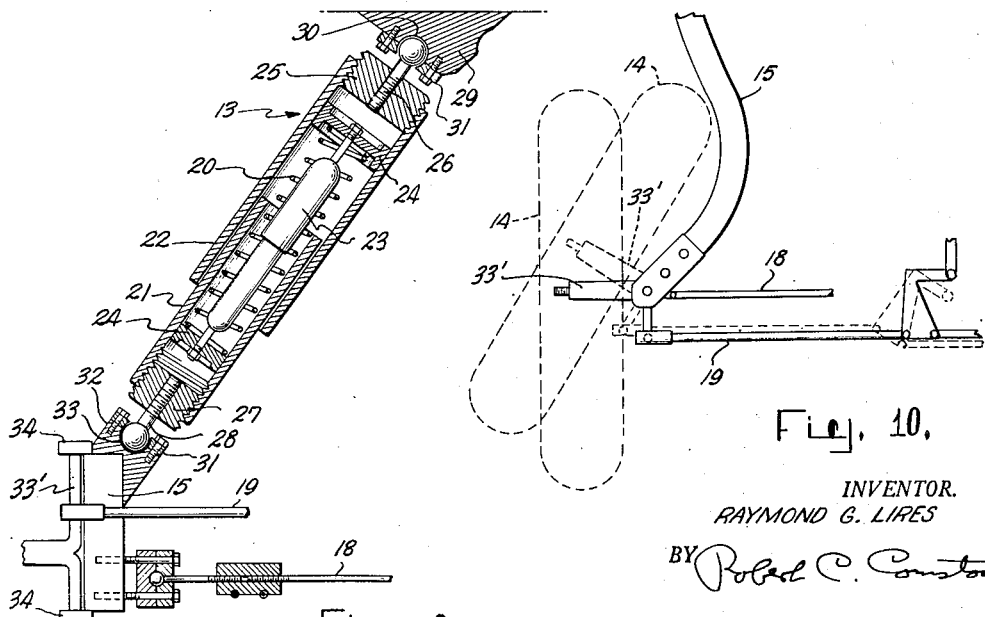
Fig. 9 is an enlarged partially sectional view showing the component parts of the spring assembly, the ball swivel joints at its ends, the connection of the steering knuckle and the connection of the tie rod.
Fig. 10 is an enlarged detailed view explaining the operation of part of the invention.

A preferred embodiment which has been selected to illustrate my invention comprises an automobile chassis frame 10, to which has been added two frame members 11 in the form of trusses or arches which are welded and braced by braces 12 to frame 10. Two spring assemblies 13 are pivotally attached to the top center portion of each frame members 11 at a point above the center of gravity of the vehicle and in the center of the width of the vehicle. This allows the static weight of the vehicle to hang below the point of suspension and exert its load through spring assembly 13 downwardly to the wheels 14, which are pivotally connected to the opposite ends of spring assemblies 13.

Wheels 14 are rotatably attached to the opposite ends of a wheel arm 15 extending inwardly to the frame 10 and is connected to frame 10 by a disk type bearing assembly 16. Bearing assembly 16 connects wheel arms 15 to the chassis 10 in such a manner that it permits upward and downward movement of wheel arm 15, but resists twist. A torsion bar 17 is connected at its ends to wheel arms 15 on the right and left of the vehicle by bearing assembly 16 and pivoted on frame 10 at disk bearing 16, the movement of one wheel arm is thereby being resisted by the wheel arm 15 on the opposite side of the vehicle.

The placement of spring assemblies 13 forms a triangle between their points of connection to frame member 11 and wheels 14, the triangle being held from spreading at its base by a tie rod 18, permitting the conventional steering system 19 to operate in a normal manner.

In order that the wheel suspension unit may be properly held in relation to the frame, a coil spring 20 is positioned inside portions of a spring carrier which comprises a telescopically arranged assembly of parts. A tube 21 is slidably engaged within a housing 22. The lower end of tube 21 is provided with a guide bracket 24, which is adapted to carry the lower end of the coil spring 20. Drilled into bracket 24 is a hole to suitably secure a conventional shock absorber 23 of the kind sometimes called an airplane type shock absorber. A second guide bracket 24 at the top of housing 22 also is adapted to carry the upper end of coil spring 20 and drilled in second bracket 24 is a hole to suitably secure shock absorber 23.

The top of housing 22 is capped by a threaded plug 25, which is also a means of length adjustment of the spring assembly. Plug 25 is drilled and tapped to receive the threaded shaft of a ball joint 26. The bottom of tube 21 is capped by a second threaded plug 27 which is also a means of length adjustment of the spring assembly. Plug 27 is drilled and tapped to receive the threaded shaft of a second ball joint 28.

The completed spring assembly is held in operating position at the top by a frame extension bracket 29 which is suitably formed with sockets 30 to receive ball joints 26 and with bolted yokes 31 to secure the ball pivots to bracket 29. The completed spring assembly is held in operating position at the bottom by a wheel arm bracket 32, which is suitably formed with a socket 33 to receive ball joint 28 and with a bolted yoke 31 to secure the ball pivot to bracket 32.

A steering axle 33' of any conventional type is pivotally mounted and secured to wheel arm 15 by brackets 34 to operate in accordance with established practices of automobile steering through steering system 19. Axle 33' is held in operating position in relation to the vehicle by swivel ball joints securing the ends of tie rod 18 to wheel arms 15. The drive wheels 14 are secured to wheel arms 15 by horizontal king pins 35 into brackets 36 bolted to the conventional wheel backing plate 37, so that a rigid drive axle housing 38 of any conventional type is free to operate independently of the chassis and wheel arm.

The disk type bearing assembly 16 consists of a sheet metal dust cover 39 formed over the exterior of the assembly and having a felt gasket 40 at the opening to provide a dust tight seal. Bolts 41 extend through lock washers 42, a circular steeling bearing plate 43 and a dust cover flange 44 into brackets 45, which are welded to frame 10. Bolts 41 continue through a circular steel plate 46 and carry nuts 47 at their opposite ends.

A circular brass bearing plate 48 is fastened to wheel arm 15 and is provided with a tubular sleeve bushing 49 which is adapted to fit and hold moving parts away from bolts 41 and act as an adjustment shim. Wheel arm 15 is rounded at its end to conform to the shape of bushing 49.

Wheel arm 15 is drilled to receive torsion bar 17 and a split collar 50. A second circular brass bearing plate 51 is fastened to wheel arm 15 and drilled to receive torsion bar 17 and split collar 50. A second circular steel plate 52 is drilled to receive torsion bar 17 and split collar 50 and is fastened to frame 10.

A brass bushing 53 is drilled to receive torsion bar 17 and split collar 50 and is fitted into frame 10. The complete assembly is bolted through frame 10, which is drilled to receive bolts 41 and bushing 53.

One of the principal advantages of my wheel suspension system in use is its ability to support the vehicle frame from a point above the center of gravity, so that the centrifugal forces of a vehicle turning in a curve will be forced outwardly more at the bottom to more equally counteract the wheel on road forces causing sway, the two forces cancelling one another, with the resulting forces directed downwardly to provide more traction, better control and less sway of the vehicle on a curve. An added advantage is that it reduces the complication of design around the steering knuckles and wheel axles.

Although I have described the invention in connection with four wheel systems, the system or parts of the system could be used only on the front portion or only in the rear of the vehicle. Some of the advantages of the invention can be obtained by using parts of it with present systems and likewise other features set forth above may be used individually, but generally with less advantage than in the combination set forth.

I claim:

1. A vehicle suspension system comprising a frame, means for mounting front and rear wheels with respect to said frame, front and rear arched frame members extending upwardly from said frame, a pair of spring assemblies attached at one end to said front frame member adjacent a midpoint thereof and at the opposite end to the front wheel mounting means, a pair of spring assemblies attached at one end to said rear frame member adjacent a midpoint thereof and at the opposite end to the rear wheel mounting means, the front wheel mounting means being positioned substantially forwardly from the front frame member and the rear wheel mounting means being positioned substantially rearwardly from the frame member, each of said wheel mounting means comprising an arm, said spring assembly and wheel being connected to one end of said arm and the opposite end of said arm being connected to said frame.

2. The subject matter of claim 1, each of said spring assemblies comprising a hollow housing, a tubing telescopically slidably mounted within one end of said housing, a coil spring disposed within said tubing and housing, said spring being connected at one end to said housing and at the opposite end to said tubing, the opposite ends of said tubing and housing being connected to said frame member and said arm.

3. The structure set forth in claim 1, and a torsion bar extending between said arms, said arms being mounted on the opposite ends of said torsion bar, so that movement of one of said wheel arms is resisted by the wheel arm mounted on the opposite end of said torsion bar.

4. A vehicle suspension system comprising a frame, means for mounting a pair of wheels adjacent each end of said frame, an arched frame member extending upwardly from said frame, a pair of spring assemblies attached at one end to said frame member adjacent a midpoint thereof and at the opposite end to one pair of said wheel mounting means, said wheel mounting means being positioned substantially toward the end of said frame from said frame member, said wheel mounting means comprising an arm, said spring assembly and wheel being connected to one end of said arm and the opposite end of said arm being connected to said frame, and a torsion bar extending between said arms, said arms being mounted on the opposite ends of said torsion bar, so that movement of one of said wheel arms is resisted by the wheel arm mounted on the opposite end of said torsion bar.

References Cited in the file of this patent

UNITED STATES PATENTS

| | | |
|---|---|---|
| 1,138,181 | Bock | May 4, 1915 |
| 2,164,602 | Valletta | July 4, 1939 |
| 2,529,162 | Kier | Nov. 7, 1950 |
| 2,755,098 | Jochumsen | July 17, 1956 |

FOREIGN PATENTS

| | | |
|---|---|---|
| 606,366 | France | June 12, 1926 |
| 433,266 | Italy | Dec. 15, 1948 |